(12) United States Patent
Nam et al.

(10) Patent No.: US 10,086,447 B2
(45) Date of Patent: Oct. 2, 2018

(54) CUTTING INSERT AND CUTTING TOOL HAVING THE SAME

(71) Applicant: KORLOY INC., Seoul (KR)

(72) Inventors: Ki-Chan Nam, Cheongju-si (KR);
Young-Heum Kim, Cheongju-si (KR);
Kane-Hee Lee, Cheongju-si (KR);
Hyo-San Kim, Cheongju-si (KR)

(73) Assignee: KORLOY INC., Seoul (KR)

( * ) Notice: Subject to any disclaimer, the term of this patent is extended or adjusted under 35 U.S.C. 154(b) by 122 days.

(21) Appl. No.: 15/320,444

(22) PCT Filed: Apr. 29, 2015

(86) PCT No.: PCT/KR2015/004337
§ 371 (c)(1),
(2) Date: Dec. 20, 2016

(87) PCT Pub. No.: WO2016/006812
PCT Pub. Date: Jan. 14, 2016

(65) Prior Publication Data
US 2017/0157684 A1  Jun. 8, 2017

(30) Foreign Application Priority Data
Jul. 8, 2014  (KR) .................. 10-2014-0085026

(51) Int. Cl.
*B23C 5/20* (2006.01)
*B23C 5/06* (2006.01)

(52) U.S. Cl.
CPC . *B23C 5/06* (2013.01); *B23C 5/20* (2013.01)

(58) Field of Classification Search
CPC ........ B23C 2200/085; B23C 2200/205; B23C 2200/367; B23C 2200/0472; B23C 2200/0433; B23C 2200/0494
See application file for complete search history.

(56) References Cited

U.S. PATENT DOCUMENTS

| | | | |
|---|---|---|---|
| 5,052,863 A | 10/1991 | Satran | |
| 7,014,396 B2 * | 3/2006 | Satran | ........... B23C 5/2213 407/103 |

(Continued)

FOREIGN PATENT DOCUMENTS

| | | |
|---|---|---|
| KR | 10-2006-0127932 A | 12/2006 |
| KR | 10-0988410 B1 | 10/2010 |

(Continued)

*Primary Examiner* — Will Fridie, Jr.
(74) *Attorney, Agent, or Firm* — Rabin & Berdo, P.C.

(57) ABSTRACT

A cutting insert and a cutting tool having same are provided. The cutting insert includes an upper surface, a lower surface having a flat surface, side surfaces connecting to each of the upper surface and the lower surface, and cutting edges being formed by the upper surface and the side surfaces. A first cutting edge among the cutting edges is inclined downward. A major side surface among the side surfaces comprises a first major side surface connected to the upper surface so as to constitute the first cutting edge, and a second major side surface connected to the first major side surface and the lower surface. The first major side surface has a reversely positive surface, and the second major side surface has a reversely positive surface or a negative surface, and a minor side surface among the side surfaces has a positive surface or a negative surface.

19 Claims, 10 Drawing Sheets

(56) References Cited

U.S. PATENT DOCUMENTS

| | | | | |
|---|---|---|---|---|
| 7,063,489 B2* | 6/2006 | Satran | ............... | B23C 5/1072 407/113 |
| 7,094,007 B2* | 8/2006 | Satran | ............... | B23C 5/06 407/113 |
| 7,241,082 B2* | 7/2007 | Smilovici | ............... | B23C 5/2221 407/113 |
| 8,449,230 B2* | 5/2013 | Nguyen | ............... | B23C 5/109 407/113 |
| 8,876,440 B2* | 11/2014 | Nam | ............... | B23C 5/06 407/113 |
| 9,186,732 B2* | 11/2015 | Michelet | ............... | B23C 5/08 |
| 9,375,793 B2* | 6/2016 | Brunetto | ............... | B23C 5/207 |
| D778,330 S * | 2/2017 | Fang | ............... | D15/139 |
| 9,981,323 B2* | 5/2018 | Fang | ............... | B23C 5/2221 |
| 2005/0169716 A1 | 8/2005 | Smilovici et al. | | |
| 2011/0129309 A1* | 6/2011 | Kovac | ............... | B23C 5/06 407/42 |
| 2013/0294850 A1 | 11/2013 | Park | | |
| 2013/0336735 A1 | 12/2013 | Nam et al. | | |
| 2015/0117969 A1* | 4/2015 | Brunetto | ............... | B23C 5/207 407/42 |
| 2015/0183034 A1* | 7/2015 | Stark | ............... | B23C 5/109 407/48 |
| 2016/0039015 A1* | 2/2016 | Matsubara | ............... | B23C 5/207 407/114 |
| 2016/0167137 A1* | 6/2016 | Agic | ............... | B23B 27/1662 407/66 |

FOREIGN PATENT DOCUMENTS

| | | |
|---|---|---|
| KR | 10-2012-0083149 A | 7/2012 |
| KR | 2013-0140328 A | 12/2013 |

* cited by examiner

CUTTING INSERT AND CUTTING TOOL HAVING THE SAME

TECHNICAL FIELD

The present disclosure relates to a cutting insert and a cutting tool having the same.

BACKGROUND ART

Generally, a cutting insert is fastened to a cutting tool mounted on a machine tool and used for cutting a workpiece that is generally formed of ferrous or nonferrous metals, non-metal material, and so on.

An example of such cutting insert is disclosed in Korean Registration Patent No. 10-0988410.

Referring to FIGS. 8 to 11, a related cutting insert will be described. For reference, FIGS. 8 to 11 each correspond to FIGS. 1, 4, 3 and 7 of KR10-0988410, and the same reference numerals are used for convenience of explanation. Further, the same names of the elements are used as used in KR10-0988410.

Such related cutting insert is a tangential milling cutting insert 10 for use with a milling cutter, which has two opposed identical end surfaces 12 having two opposed identical major side surfaces 18, generally in a shape of parallelogram, and two opposed identical minor side surfaces 16 extending therebetween. Each of the end surfaces 12 includes a peripheral edge 54 including a cutting edge 52, and four corners of two diagonally-facing upward corners 24 and two diagonally-facing downward corners 26. Each of the end surfaces 12 is provided with a junction member 28 having a junction surface 30.

Figure 11:
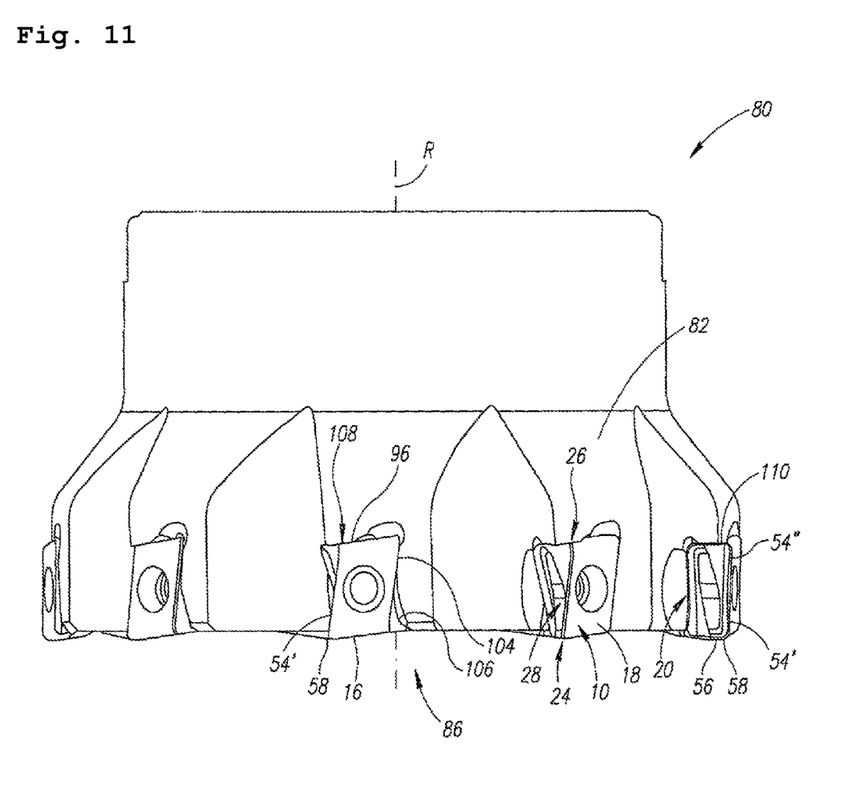
FIG. 11 is a side view of a milling cutter having the cutting insert of FIG. 8 mounted thereon.

Meanwhile, the related cutting insert adopts double-sided type, and a major side surface 18 and a minor side surface 16 are perpendicular to each other. Therefore, fastening with a holder can be relatively less secure (see FIGS. 10 and 11A).

Further, as illustrated in FIG. 11, there is a limit to providing a large axial rake angle of the peripheral edge 54 and thus, enhancement of the cutting characteristics is also limited.

Figure 8:
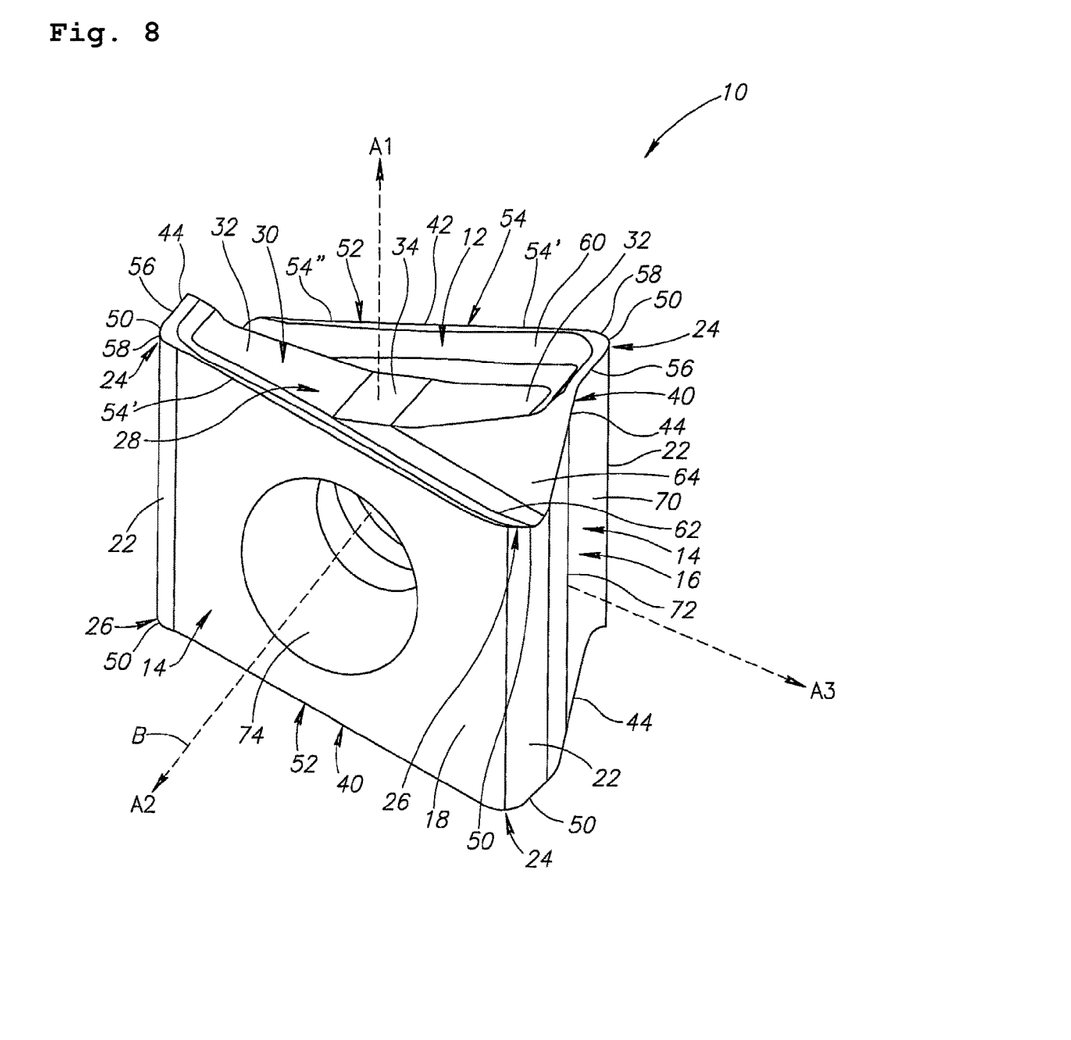
FIG. 8 is a perspective view of a related cutting insert.

Further, as illustrated in FIG. 8, when fastening with the cutting tool, the presence of the rake surface 60 formed on the end surface 12 serving as a fastening surface results in a decreased fastening area and therefore, fastening with the cutting tool is deteriorated.

Figure 9:
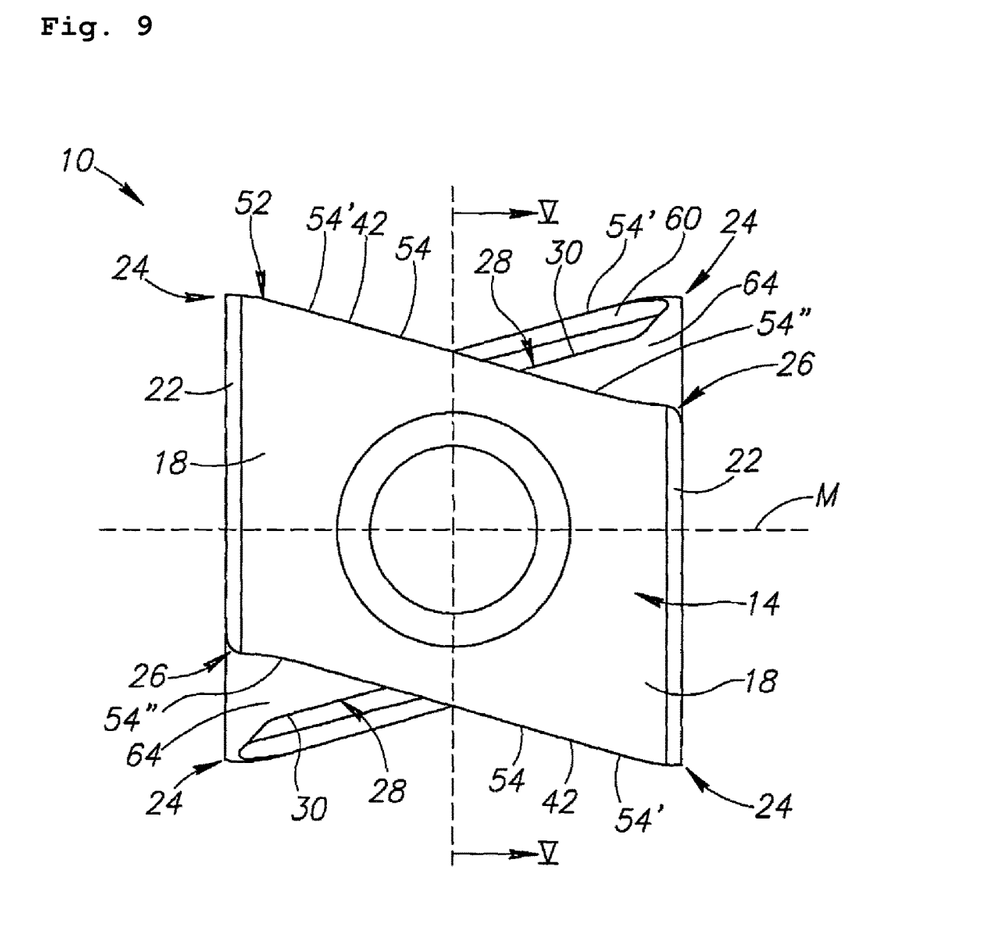
FIG. 9 is a side view of the cutting insert of FIG. 8.
Figure 10:
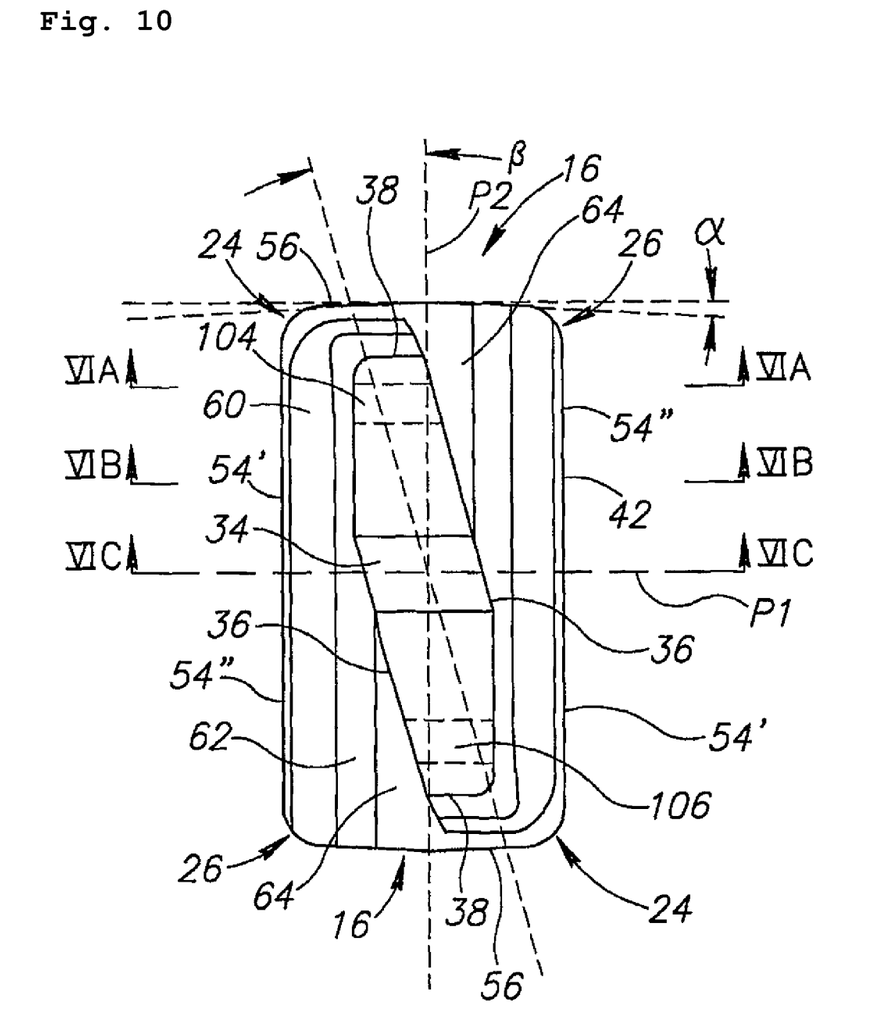
FIG. 10 is a plan view of the cutting insert of FIG. 8.

Further, as illustrated in FIG. 9, the size of the cutting insert is considerably increased, in which case the number of cutting inserts that are applicable for use with the milling cutter with the same machining diameter is limited, and the machining productivity is deteriorated.

In particular, the related double-sided cutting insert uses a portion (i.e., inner end surface 46) of the end surfaces 12 (upper and lower surfaces) as a fastening surface, and uses the other as an inclined surface (i.e., rake surface 44) to discharge chips (see paragraphs [0044] and [0047] of KR10-0988410 for reference). Accordingly, the surface area of the fastening surface for fastening with the milling cutter body is narrow, and considerable problem occurs (e.g., breakage of the fastening screw passed through the cutting insert and fastened into the milling cutter body, which can occur during high-speed high-stiffness machining, generation of vibration during cutting process, or the like).

Further, when set in the cutter body such that the upper surface is used as the rake surface, the lower surface is used as the fastening surface. Alternatively, when the lower surface is used as the rake surface, the upper surface is used as the fastening surface. This relationship causes problem such as deteriorated performance due to limits in the designing of rake surface for chip evacuation, designing of helix angles, and so on.

Meanwhile, in an example of a flat-shaped insert in which a side surface is formed as a positive surface, since the side surface serving as the fastening surface is formed as a positive surface, constraining force is decreased after fastening with the cutter body, and problem of vibration occurs due to cutting impact during cutting process.

DISCLOSURE OF INVENTION

Technical Problem

An object of the present disclosure is to solve the problems mentioned above, and accordingly, it is an object of the present disclosure to provide a cutting insert capable of enhancing cutting characteristics and fastening characteristics, and a cutting tool having the same.

Further, an object of the present disclosure is to provide a cutting insert capable of preventing damages on an inactive cutting edge by workpiece chips generated by an active cutting edge, and ensuring stiffness of the cutting insert.

Further, although not explicitly described, the present disclosure includes other objects that can be derived from the configuration of the present disclosure.

Solution to Problem

In order to achieve the objects mentioned above, a cutting insert according to an exemplary embodiment of the present disclosure is provided, in which the cutting insert may include an upper surface; a lower surface being a flat surface; side surfaces each connecting to the upper surface and the lower surface; and cutting edges being formed by the upper surface and the side surfaces, in which a first cutting edge among the cutting edges is inclined downward from one side which is a high portion to the other side which is a low portion, a major side surface among the side surfaces comprises a first major side surface connected to the upper surface so as to constitute the first cutting edge, and a second major side surface connected to the first major side surface and the lower surface, the first major side surface is a reversely positive surface, and the second major side surface is a reversely positive surface or a negative surface, and a minor side surface among the side surfaces is a positive surface or a negative surface.

Further, when the cutting insert is seen on a plan view, an angle formed by the minor side surface and the second major side surface each connected to the high portion H is less than 90 degrees.

Further, in the cutting insert, when the second major side surface is a reversely positive surface, the second major side surface is formed at a positive angle less than the first major side surface.

Further, in the cutting insert, the second major side surface and the minor side surface are operated as a mounting surface when the cutting insert is mounted on a cutting tool.

Further, in the cutting insert, a fastening hole provided for fastening with a cutting tool is formed by penetrating the second major side surfaces facing each other.

Further, the cutting insert has the upper surface that is provided with rake surfaces inclined from the first cutting edge into the inside of the upper surface, and a projecting portion protruded upward between boundaries of the rake surfaces.

Further, when seen on a plan view, the cutting insert is in 180-degree rotational symmetry with reference to an intersection between a first imaginary line connecting a pair of the high portions opposed to each other, and a second imaginary line connecting a pair of the low portions opposed to each other.

Further, in the cutting insert, the upper surface is inclined from the high portions toward the intersection.

Further, in the present cutting insert, the upper surface is composed of non-flat surface only.

Further, a cutting tool on which the cutting insert according to an exemplary embodiment is mounted is provided, wherein the cutting tool is provided with a mounting sheet surface where the cutting insert is mounted, and the mounting sheet surface includes a second major side surface sheet and a lower surface sheet surface each being in contact with, and having corresponding shapes to the second major side surface and the lower surface.

In the present cutting tool, the second major side surface sheet surface and the lower surface sheet surface are flat surfaces.

Effects of Invention

With the configuration described above, the present disclosure can provide effects as follows.

The cutting insert according to the present disclosure can have a greater rake angle of the major cutting edge than that of the related cutting insert. Accordingly, when the cutting insert is mounted on the cutting tool, greater axial rake angle than the related cutting insert can be ensured and as a result, cutting characteristic can be enhanced.

Further, by providing two-stage configuration of the major side surface 3, that is, by configuring the first major side surface 31 as a reversely positive surface, the stiffness of the major cutting edge can be increased. Also by additionally configuring the second major side surface 32 as a negative surface or a reversely positive surface with a small angle, fastening performance with the cutting tool can be enhanced.

Further, unlike the related art, the entire lower surface 2, which is flat surface, can be used as the fastening surface with the cutting tool. Accordingly, contact area with the cutting tool can be increased than the related art and fastening characteristics can be enhanced.

Further, compared to the related cutting insert, the thickness of the cutting insert can be relatively reduced such that the number of cutting inserts applicable for use with the milling cutter with the same machining diameter can be increased, and as a result, machining productivity can be enhanced.

Further, when the cutting insert is mounted on the cutting insert in order to process the workpiece, the projecting portion 12 protruding convexely upward prevents the chips, which are generated from the workpiece by the "active" first cutting edge 51 of the first cutting edges 5 that is operated to cut the workpiece, from moving into the "inactive" first cutting edge 52 (positioned inside in the diameter direction of the cutting tool) of the first cutting edges 5 and damaging the inactive first cutting edge 52. Accordingly, since damages to the inactive first cutting edge 52 are minimized, when service life of the active first cutting edge 51 is expired, the cutting insert may be rotated by 180 degrees and the inactive first cutting edge 52 may be mounted on the cutting tool and put in the position of the active first cutting edge. By doing this, use time of the cutting insert is increased from the related art, thus contributing to cost reduction.

Further, the cutting insert has a flat lower surface, and the fastening hole 8 is penetrating the opposed second main side surfaces 32, in which case the upper surface formed entirely as the flat surface may cause decreased stiffness of the cutting insert. The cutting insert can ensure sufficient stiffness of the cutting insert, by forming the projecting portion 12 that is convexely protruded upward.

Further, the effects of the present disclosure are not limited to those mentioned above, but include those that are derived from the detailed description of the present disclosure.

MODE FOR THE INVENTION

Hereinbelow, a cutting insert (hereinbelow, 'the cutting insert') according to exemplary embodiments of the present disclosure will be described in detail with reference to accompanying drawings.

As illustrated in FIGS. 1 to 4, the cutting insert includes an upper surface 1, a lower surface 2 having flat surface, side surfaces 4, 5 each being connected to the upper surface 1 and the lower surface 2, and cutting edges 5, 6 formed by the upper surface 1 and the side surfaces 4, 5. As an example, in an exemplary embodiment, a fastening hole 3 for fastening into a cutting tool is penetrating the opposed side surface 3, or more specifically, the fastening hole 3 is penetrating the second major side surface 32 that will be described below.

Meanwhile, the side surfaces include two opposed major side surfaces 3 and two opposed minor side surfaces 4, and the cutting edges include two first cutting edges 5 (i.e., major cutting edges) and two second cutting edges 7 (i.e., minor cutting edges).

Figure 4:
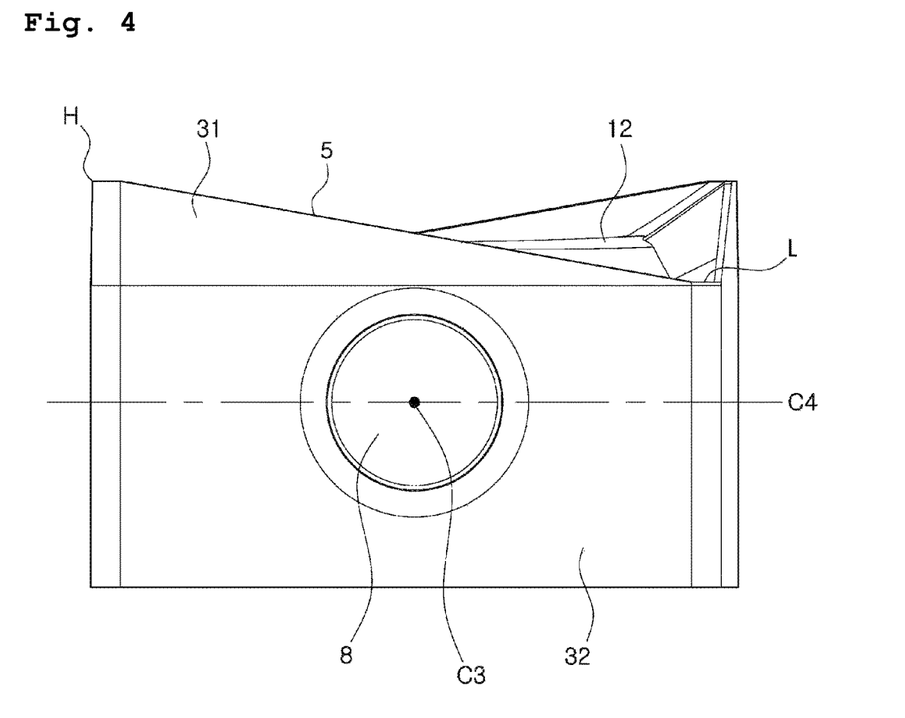
FIG. 4 is a front view of the cutting insert of FIG. 1.

As illustrated in FIG. 4, the first cutting edges 6 (i.e., peripheral cutting edges) are inclined downward from one side to the other side. The 'one side' herein corresponds to a high portion H, while the 'other side' herein corresponds to a low portion (L). Meanwhile, referring to FIG. 5, when the cutting insert is mounted on the cutting tool, the first cutting edge 5 ('active first cutting edge' 51) of the first cutting edges 5 that is operated for cutting the workpiece (not illustrated) is positioned outside the cutting tool in a diameter direction, while the first cutting edge 5 ('inactive first cutting edge' 52) not participating in the cutting of the workpiece is positioned inside the cutting tool in the diameter direction.

Figure 6:
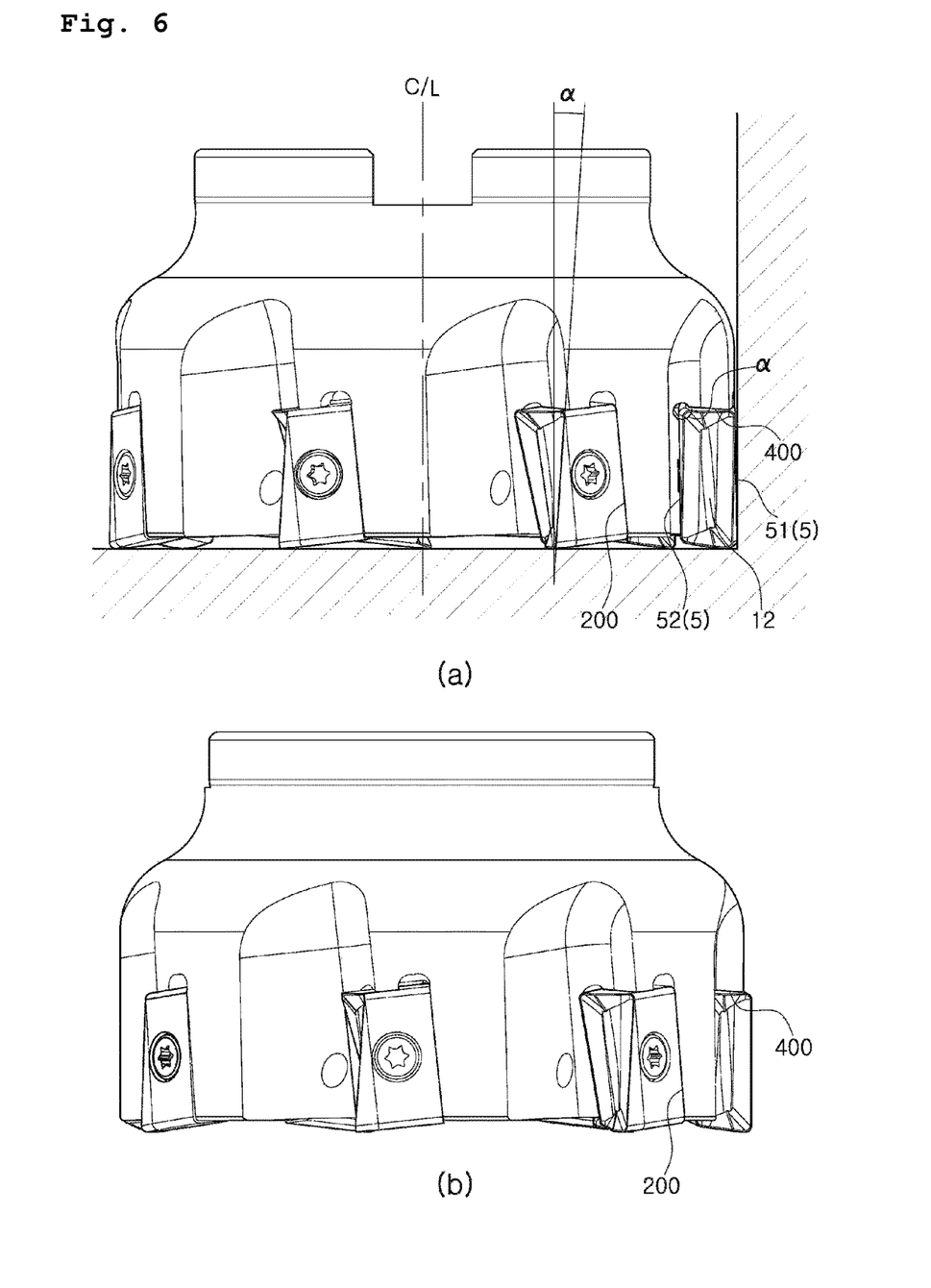
FIG. 6 is a side view of a cutting tool having the cutting insert of FIG. 1 mounted thereon.

The flat-shaped configuration of the cutting insert may provide a far greater rake angle of the major cutting edges 5 than the related cutting insert. That is, as illustrated in FIG. 6, cutting characteristic can be enhanced, because even when the cutting insert is in a negative setting on the cutting tool, a far greater axial rake angle ($\alpha$) than the related cutting insert can be ensured.

As illustrated in FIG. 4, the major side surfaces 3 have a first major side surface 31 and a second major side surface 32.

The first major side surface 31 is connected to the upper surface 1 to form the first cutting edge 5. The second major side surface 32 is connected to the first major side surface 31 and the lower surface 2, respectively.

The first major side surface 31 may be formed as a reversely positive surface, and the second major side surface 32 may be formed as a reversely positive surface or a negative surface, respectively. For convenience of explanation, it is illustrated in an exemplary embodiment that the second major side surface 32 is formed as a negative surface.

The first major side surface 31 is formed as a reversely positive surface, thus increasing cutting edge angle of the major cutting edge 5 and providing a resultant effect of increased stiffness of the cutting edge.

Meanwhile, a 'negative surface' refers to a surface that is perpendicular to a plane, wherein the plane is formed with an imaginary line C3 passing through a center of the fastening hole 3, and an imaginary line C4 parallel to the lower surface 2 and orthogonal to the imaginary line C3. The non-perpendicular surface is referred to as a 'positive surface'. The positive surface is divided into a reversely positive surface that is a surface inclined in the same manner as the first major side surface 31 with respect to the imaginary line C3, and a positive surface that is reversely inclined surface.

Figure 1:
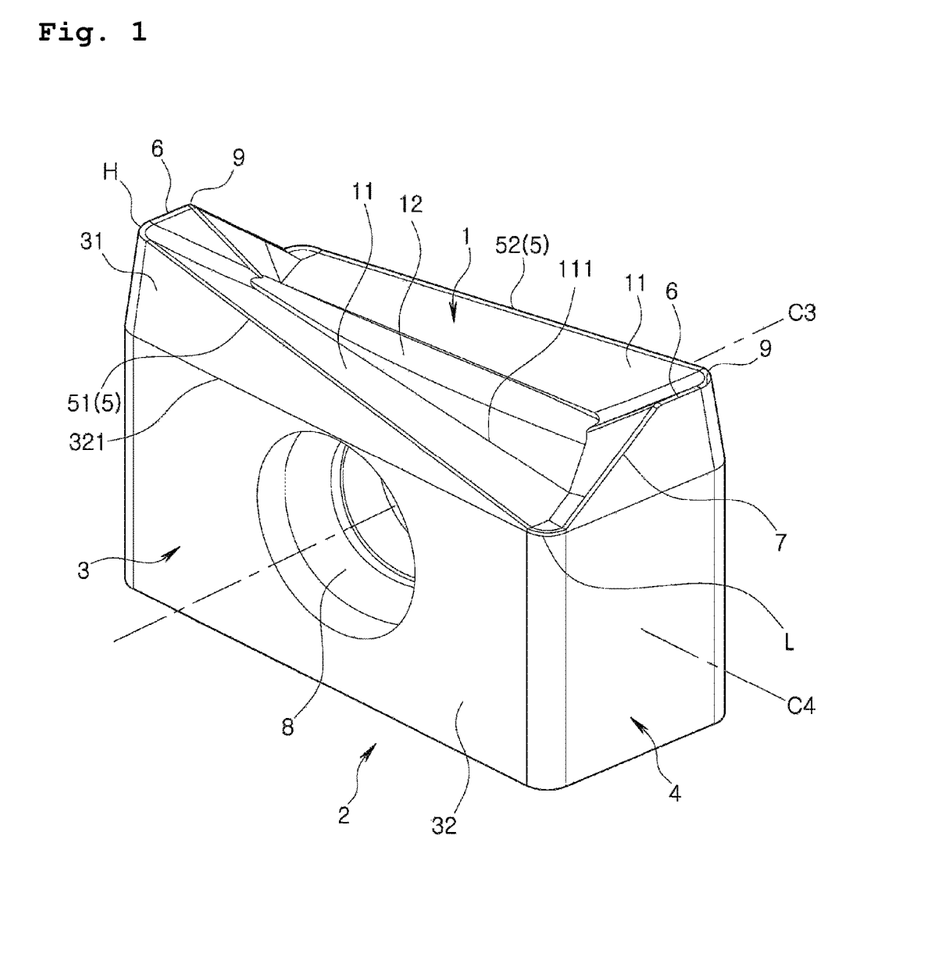
FIG. 1 is a perspective view of a cutting insert according to an exemplary embodiment of the present disclosure.

The second major side surface 32 is operated as a mounting surface when mounted on the cutting tool to be described below. Further, as illustrated in FIGS. 1 and 4, the second major side surface 32 has a rectangular shape, and one end of an upper boundary line 321 is connected to the low portion L. Specifically, as illustrated in FIGS. 2 and 6(a), an angle ($\alpha$) between the minor side surface 4 and the second major side surface 32 connected to the high portion H is formed at less than 90 degrees such that this particular portion can be operated as a wedge upon fastening into the cutting tool, to thus further increase the fastening characteristics than related art.

Figure 3:
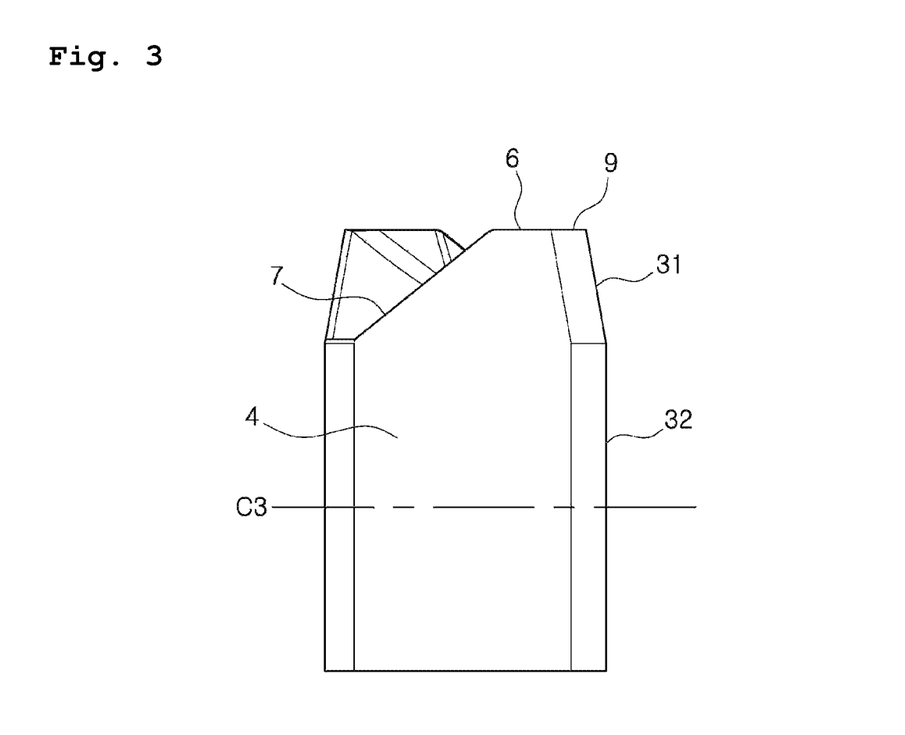
FIG. 3 is a right side view of the cutting insert of FIG. 1.

As illustrated in FIG. 3, the minor side surface 4 is connected to the upper surface 1 to form a minor cutting edge 6 (frontal cutting edge, or second cutting edge). The minor side surface 4 may have a positive surface or a negative surface.

Further, the lower surface 2 of the cutting insert, and the second major side surface 32 and the minor side surface 4 are operated as a mounting surface when mounted upon the cutting tool (milling cutter) which will be described below.

Figure 2:
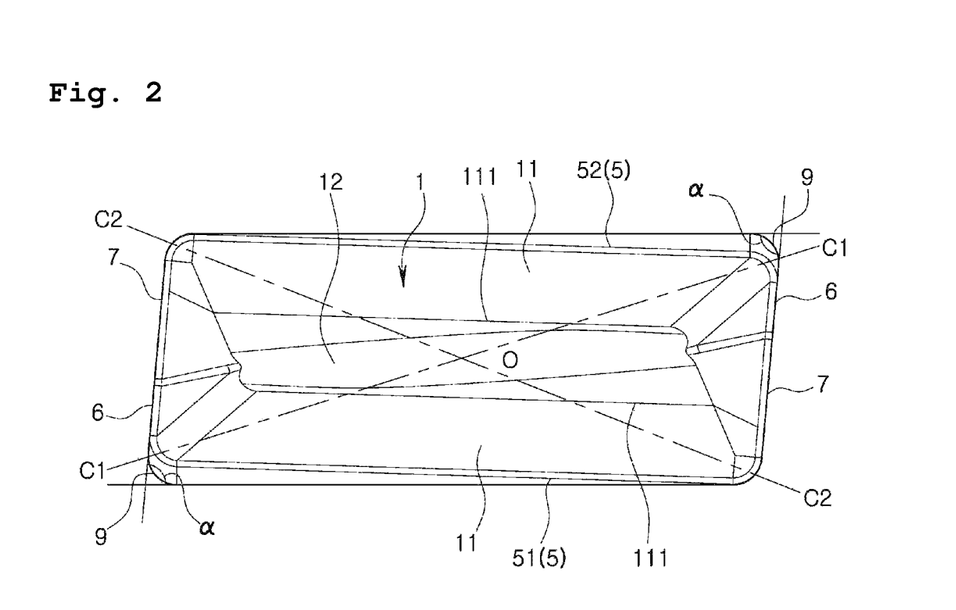
FIG. 2 is a plan view of the cutting insert of FIG. 1.

As illustrated in FIG. 2, when viewed in the plan view, the cutting insert is in 180-degree rotational symmetry with reference to an intersection O between the first imaginary line C1 connecting a pair of opposed high portions H, and a second imaginary line C2 connecting a pair of opposed low portions L.

Further, the upper surface 1 of the cutting insert is inclined from the high portion H toward the intersection O. This allows a large rake angle to be formed by the first cutting edge 5 during cutting of the workpiece, and as a result, cutting characteristic can be enhanced. Meanwhile, since the upper surface 1 of the cutting insert is not used as the mounting surface, it is not required to provide a flat surface (plane) during designing of the upper surface, and the upper surface can have non-flat surfaces (e.g., curved surfaces, etc.) only.

Further, the upper surface 1 is provided with a rake surface 11 inclined from the first cutting edge 5 to the inside of the upper surface 1, and a projecting portion 12 protruding upward between boundary lines 111 of the rake surfaces 11.

Accordingly, as illustrated in FIGS. 1 and 6, when the cutting insert is mounted on the cutting insert in order to process the workpiece, the projecting portion 12 protruding convexely upward prevents the chips, which are generated from the workpiece by the "active" first cutting edge 51 of the first cutting edges 5 that is operated to cut the workpiece, from moving into the "inactive" first cutting edge 52 (positioned inside in the diameter direction of the cutting tool) of the first cutting edges 5 and damaging the inactive first cutting edge 52. Accordingly, since damages to the inactive first cutting edge 52 are minimized, when service life of the active first cutting edge 51 is expired, the cutting insert may be rotated by 180 degrees and the inactive first cutting edge 52 may be mounted on the cutting tool and put in the position of the active first cutting edge. By doing this, use time of the cutting insert is increased from the related art, thus contributing to cost reduction. Further, the cutting insert has a flat lower surface, and the fastening hole 8 is penetrating the opposed second main side surfaces 32, in which case the upper surface formed entirely as the flat surface may cause decreased stiffness of the cutting insert. The cutting insert can ensure sufficient stiffness of the cutting insert, by forming the projecting portion 12 that is convexely protruded upward.

Further, the cutting insert uses the entire flat lower surface 2 as the mounting surface when mounted on the cutting tool, thus increases the area of contact with the cutting tool and enhances fastening characteristics compared to the related art.

Figure 5:
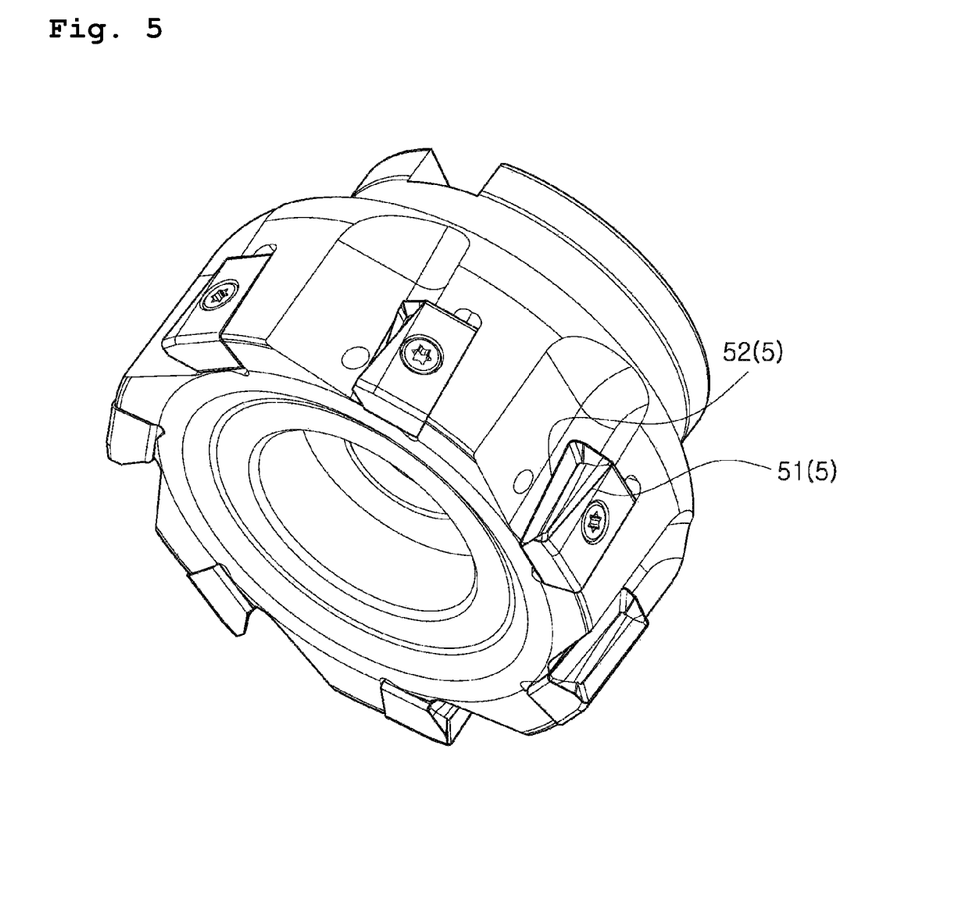
FIG. 5 is a perspective view of a cutting tool having the cutting insert of FIG. 1 mounted thereon.

Further, as illustrated in FIGS. 4 and 5, the cutting insert may be formed as a flat-shaped insert so that, compared to the related cutting insert (see FIG. 9), the size (thickness) of the cutting insert can be relatively reduced. Accordingly, the number of cutting inserts that can be used with the milling cutter with the same machining diameter can be increased and machining productivity can be increased.

Hereinbelow, a cutting tool (milling cutter) mounted with the cutting insert described above will be described with reference to FIGS. 5 to 7. By way of an example, the cutting tool may be a milling cutter for shoulder milling.

Figure 7:
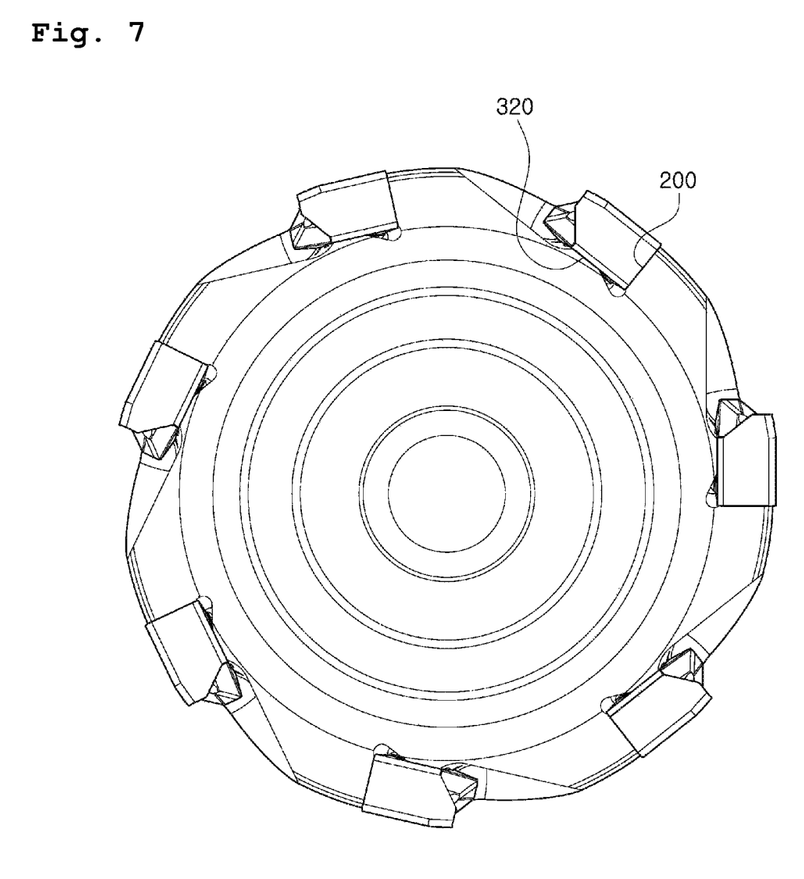
FIG. 7 is a bottom view of a cutting tool having the cutting insert of FIG. 1 mounted thereon.

The cutting tool is provided with a mounting sheet surface for fastening with the cutting insert.

Specifically, the mounting sheet surface includes a second major side surface sheet surface 320, a minor side surface sheet surface 400, and a lower surface sheet surface 200.

These sheet surfaces, i.e., the second major side surface sheet surface 320, the minor side surface sheet surface 400, the lower surface sheet surface 200 are in contact with, and have corresponding shapes to the second major side surface 32 that is a negative surface, the minor side surface 4 that is a negative surface, and the lower surface that is a flat surface in the cutting insert.

Accordingly, the second major side surface 32 of the major side surfaces 4 that is operated as the mounting surface has the negative surface, and stable fastening is thus enabled. Further, since the minor side surfaces 4 may also have the negative surface, fastening stability with the cutting tool can be further increased.

As described above, the cutting insert according to the present disclosure has two stages of major side surfaces such that the first major side surface forming the cutting edge is formed into a reversely positive surface to thus increase the stiffness of the cutting edge, while the second major side surface is formed into, for example, a negative surface to thus promote fastening stability along with the minor side surface, or configured into a flat-shape in which case only the lower surface is operated as the mounting surface, and the upper surface is separately operated as the rake surface. Accordingly, compared to the related art, increasing the fastening area and designing the structure of the rake surface are not limited.

As described above, the cutting insert can originally have a surface (lower surface) for use as the mounting surface separately from the surface (upper surface) for use as the rake surface for the purpose of chip evacuation, such that the problems associated with the related double-sided cutting insert, i.e., narrow area of the mounting surface for fastening with the cutter body and subsequent damage that follows during high-speed high rigidity processing to the fastening screw that fastens the cutting insert to the cutter body, generation of vibration during processing, and so on, can be resolved.

Further, the flat-shaped negative-type cutting insert according to the present disclosure uses only the lower surface as the mounting surface. Accordingly, upper surface is not limited to a specific design in the designing of rake surface for chip evacuation, designing of helix angle, and so on. Additionally, while a flat surface (plane) is generally used as the surface for fastening with the cutter body, the cutting insert uses only the lower surface as the mounting surface and does not use the upper surface as the mounting surface. Accordingly, it is not necessary to form flat surface when designing the upper surface, and the upper surface may be freely designed into non-flat surface (e.g., curved surface, etc.) only.

Further, unlike the flat-shaped insert in which the side surfaces have the positive surfaces, the side surface serving as the mounting surface forms a negative surface. Accordingly, it is thus possible to ensure stable constraining force for fastening with the cutter body, and the problem of vibration due to cutting impact during cutting process can also be minimized.

Further, since the lower surface has flat surface, the cutting insert is easy to manufacture and has high industrial applicability.

The foregoing exemplary embodiments and advantages are merely exemplary and are not to be construed as limiting the exemplary embodiments. The present teaching can be readily applied to other types of apparatuses. Also, the description of the exemplary embodiments of the present inventive concept is intended to be illustrative, and not to limit the scope of the claims.

INDUSTRIAL APPLICABILITY

The present disclosure is applicable in a cutting insert and a cutting tool having the cutting insert mounted thereon.

What is claimed is:

1. A cutting insert, comprising:
    an upper surface; a lower surface being a flat surface; side surfaces each connecting to the upper surface and the lower surface; and cutting edges being formed by the upper surface and the side surfaces,
    wherein a first cutting edge among the cutting edges is inclined downward from one side which is a high portion to the other side which is a low portion,
    a major side surface among the side surfaces comprises a first major side surface connected to the upper surface so as to constitute the first cutting edge, and a second major side surface connected to the first major side surface and the lower surface,
    the first major side surface is a reversely positive surface, and the second major side surface is a reversely positive surface or a negative surface, and
    a minor side surface among the side surfaces is a positive surface or a negative surface.

2. The cutting insert of claim 1, wherein, when seen on a plan view, an angle formed by the minor side surface and the second major side surface each connected to the high portion H is less than 90 degrees.

3. The cutting insert of claim 1, wherein, when the second major side surface is a reversely positive surface, the second major side surface is formed at a positive angle less than the first major side surface.

4. The cutting insert of claim 1, wherein the second major side surface and the minor side surface are operated as a mounting surface when the cutting insert is mounted on a cutting tool.

5. The cutting insert of claim 1, wherein a fastening hole provided for fastening with a cutting tool is formed by penetrating the second major side surfaces facing each other.

6. The cutting insert of claim 5, wherein the upper surface is provided with rake surfaces inclined from the first cutting edge into the inside of the upper surface, and a projecting portion protruded upward between boundaries of the rake surfaces.

7. The cutting insert of claim 1, wherein, when seen on a plan view, the cutting insert is in 180-degree rotational symmetry with reference to an intersection between a first imaginary line connecting a pair of the high portions opposed to each other, and a second imaginary line connecting a pair of the low portions opposed to each other.

8. The cutting insert of claim 7, wherein the upper surface is inclined from the high portions toward the intersection.

9. The cutting insert of claim 8, wherein the upper surface is composed of non-flat surface only.

10. A cutting tool on which the cutting insert as set forth in claim 9 is mounted,
    wherein the cutting tool is provided with a mounting sheet surface where the cutting insert is mounted, and
    the mounting sheet surface comprises a second major side surface sheet and a lower surface sheet surface each being in contact with, and having corresponding shapes to the second major side surface and the lower surface.

11. The cutting tool of claim 10, wherein the second major side surface sheet surface and the lower surface sheet surface are flat surfaces.

12. A cutting tool on which the cutting insert as set forth in claim 8 is mounted,
    wherein the cutting tool is provided with a mounting sheet surface where the cutting insert is mounted, and
    the mounting sheet surface comprises a second major side surface sheet and a lower surface sheet surface each being in contact with, and having corresponding shapes to the second major side surface and the lower surface.

13. A cutting tool on which the cutting insert as set forth in claim 7 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

14. A cutting tool on which the cutting insert as set forth in claim 6 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

15. A cutting tool on which the cutting insert as set forth in claim 5 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

16. A cutting tool on which the cutting insert as set forth in claim 4 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

17. A cutting tool on which the cutting insert as set forth in claim 3 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

18. A cutting tool on which the cutting insert as set forth in claim 2 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

19. A cutting tool on which the cutting insert as set forth in claim 1 is mounted, wherein the cutting tool is provided with a mounting sheet surface where the cutting insert is mounted, and the mounting sheet surface comprises a second major side surface sheet and a lower surface sheet surface each being in contact with, and having corresponding shapes to the second major side surface and the lower surface.

\* \* \* \* \*